United States Patent [19]
Maninger et al.

[11] Patent Number: 4,990,832
[45] Date of Patent: Feb. 5, 1991

[54] COLOR DISPLAY SYSTEM

[75] Inventors: Loren L. Maninger; Frank M. Koch, both of Lancaster, Pa.

[73] Assignee: RCA Licensing Corporation, Princeton, N.J.

[21] Appl. No.: 526,754

[22] Filed: May 22, 1990

[51] Int. Cl.[5] ............................................ H01J 29/58
[52] U.S. Cl. .................................. 315/382.1; 315/386
[58] Field of Search ...................... 315/382, 382.1, 386

[56] References Cited

U.S. PATENT DOCUMENTS

| | | | |
|---|---|---|---|
| 3,766,419 | 10/1973 | Barbin | 313/928 |
| 4,037,133 | 7/1977 | Sennik | 315/382 |
| 4,399,388 | 10/1980 | Hamano et al. | 313/414 |
| 4,558,253 | 12/1985 | Bechis et al. | 313/414 |
| 4,707,639 | 11/1987 | Truskalo | 315/382 |
| 4,743,796 | 5/1988 | Baudry et al. | 313/414 |
| 4,764,704 | 8/1988 | New et al. | 313/414 |
| 4,877,998 | 10/1989 | Maninger et al. | 315/15 |
| 4,899,091 | 2/1990 | Odenthal | 315/382 |

Primary Examiner—Theodore M. Blum
Attorney, Agent, or Firm—Joseph S. Tripoli; Dennis H. Irlbeck

[57] ABSTRACT

The present invention provides an improvement in a color display system. The system includes a cathode-ray tube having an electron gun for generating and directing three electron beams along paths toward a screen of the tube. The gun includes electrodes comprising a beam forming region, electrodes for forming a prefocus lens and electrodes for forming a main focusing lens. The system also includes a magnetic field deflection yoke. The improvement comprises means for applying a dynamic signal to one of the electrodes forming the prefocus lens when electron beam current drops below a predetermined level. The dynamic signal is a maximum voltage when there is no deflection of the electron beams and decreases in voltage to a minimum at maximum horizontal deflection of the electron beams.

5 Claims, 4 Drawing Sheets

COLOR DISPLAY SYSTEM

The present invention relates to color display systems including cathode-ray tubes having inline electron guns, and particularly to such a system that corrects for moiré fringe on the tube viewing screen.

BACKGROUND OF THE INVENTION

As the demand for higher resolution cathode-ray tube performance continues, electron guns capable of smaller electron beam spot size performance at both high and low currents are being designed. As the spot size is reduced, the problem of moiré fringes occurs at low currents due to the interaction of the scan line pattern with the pattern of the mask holes. Moiré is a woodgrain pattern that is visible on a tube screen. Previous efforts to eliminate moiré have included optimizing the scan line pattern in relation to the mask hole pattern through reduced vertical aperture spacing, rotated mask holes, and random mask hole patterns. The reduced vertical aperture spacing is, in principle, a solution to the moiré problem. However, from practical considerations of mask strength and manufacturability, masks having small enough vertical aperture spacings are not practical to make for large screen tubes. The technique of rotated mask holes or random hole patterns can also reduce moiré, but introduces other problems, such as a "grainy" screen appearance, which is just as objectionable as the moiré itself.

It is, therefore, desirable to have an electron gun design in which high current electron beam spot sizes are reduced for improved resolution, but the low current spot size is kept above a minimum value to prevent moiré fringes. Because it is difficult to tailor the design of a gun to have a small high current spot size while maintaining a specified minimum low current spot size in a standard gun design, the present invention provides a system incorporating an electron gun with improved spot size at all current levels, by utilizing a low current dynamic spot size control.

SUMMARY OF THE INVENTION

The present invention provides an improvement in a color display system. The system includes a cathode-ray tube having an electron gun for generating and directing three electron beams along paths toward a screen of the tube. The gun includes electrodes comprising a beam forming region, electrodes for forming a prefocus lens and electrodes for forming a main focusing lens. The system also includes a magnetic field deflection yoke. The improvement comprises means for applying a dynamic signal to one of the electrodes forming the prefocus lens when electron beam current drops below a predetermined level. The dynamic signal is a maximum voltage when there is no deflection of the electron beams and decreases in voltage to a minimum at maximum horizontal deflection of the electron beams.

DETAILED DESCRIPTION OF THE PREFERRED EMBODIMENT

Figure 1:
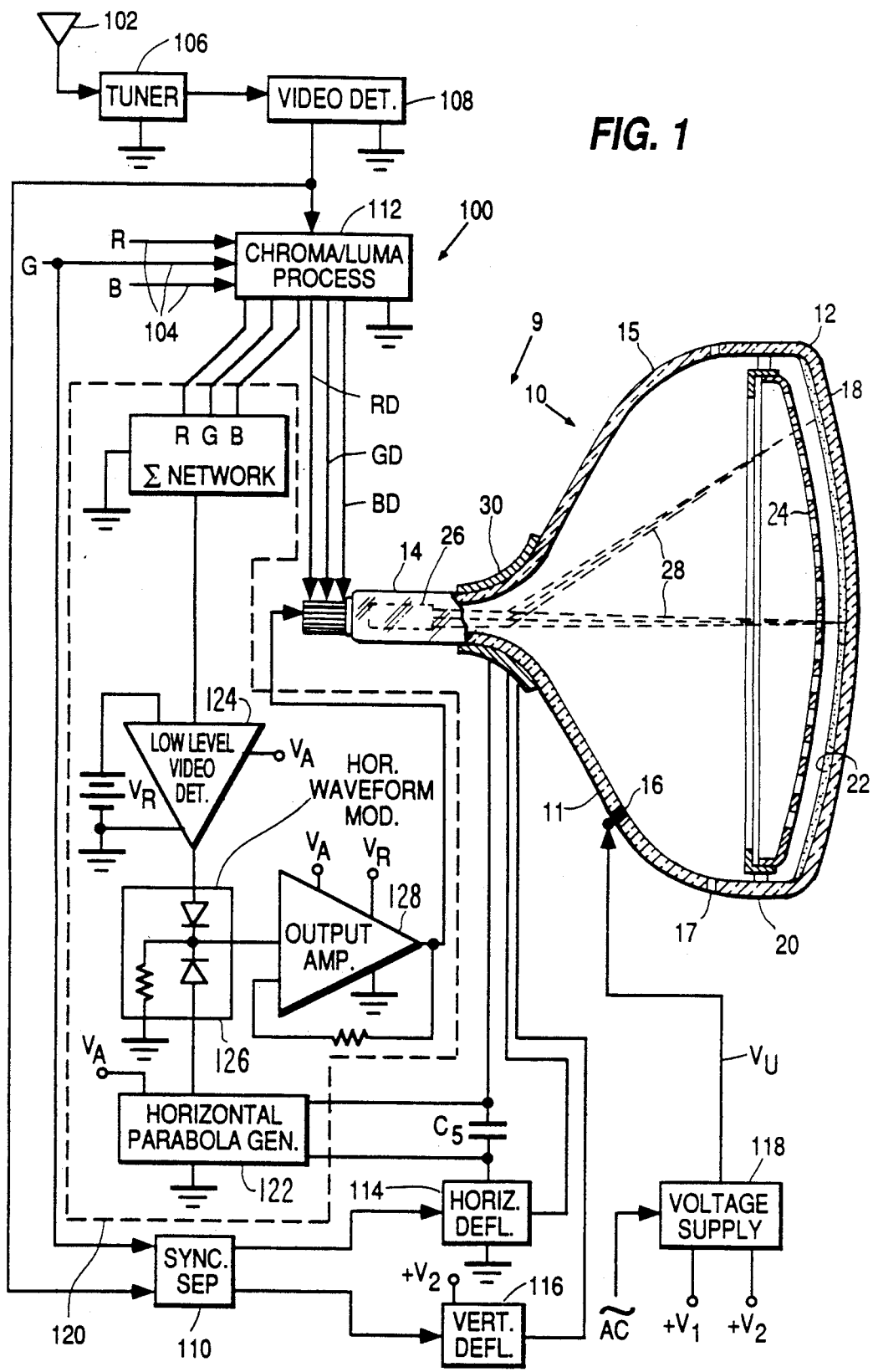
FIG. 1 is a plan view, partly in axial section, of a color display system embodying the invention.

FIG. 1 shows a color display system 9 including a rectangular color picture tube 10 having a glass envelope 11 comprising a rectangular faceplate panel 12 and a tubular neck 14 connected by a rectangular funnel 15. The funnel 15 has an internal conductive coating (not shown) that extends from an anode button 16 to the neck 14. The panel 12 comprises a viewing faceplate 18 and a peripheral flange or sidewall 20 which is sealed to the funnel 15 by a glass frit 17. A three-color phosphor screen 22 is carried by the inner surface of the faceplate 18. The screen 22 preferably is a line screen with the phosphor lines arranged in triads, each triad including a phosphor line of each of the three colors. Alternatively, the screen can be a dot screen. A multiapertured color selection electrode or shadow mask 24 is removably mounted, by conventional means, in predetermined spaced relation to the screen 22. An improved electron gun 26, shown schematically by dotted lines in FIG. 1, is centrally mounted within the neck 14 to generate and direct three electron beams 28 along convergent paths through the mask 24 to the screen 22.

The tube of FIG. 1 is designed to be used with an external magnetic deflection yoke, such as the yoke 30 shown in the neighborhood of the funnel-to-neck junction. When activated, the yoke 30 subjects the three beams 28 to magnetic fields which cause the beams to scan horizontally and vertically in a rectangular raster over the screen 22. The initial plane of deflection (at zero deflection) is at about the middle of the yoke 30. Because of fringe fields, the zone of deflection of the tube extends axially from the yoke 30 into the region of the gun 26. For simplicity, the actual curvature of the deflection beam paths in the deflection zone is not shown in FIG. 1. In the preferred embodiment, the yoke 30 produces a self-convergence of the three electron beams at the tube screen.

FIG. 1 also shows a portion of the electronics used for exciting the tube 10 and yoke 30. These electronics are described later, after a description of the electron gun 26.

Figure 2:
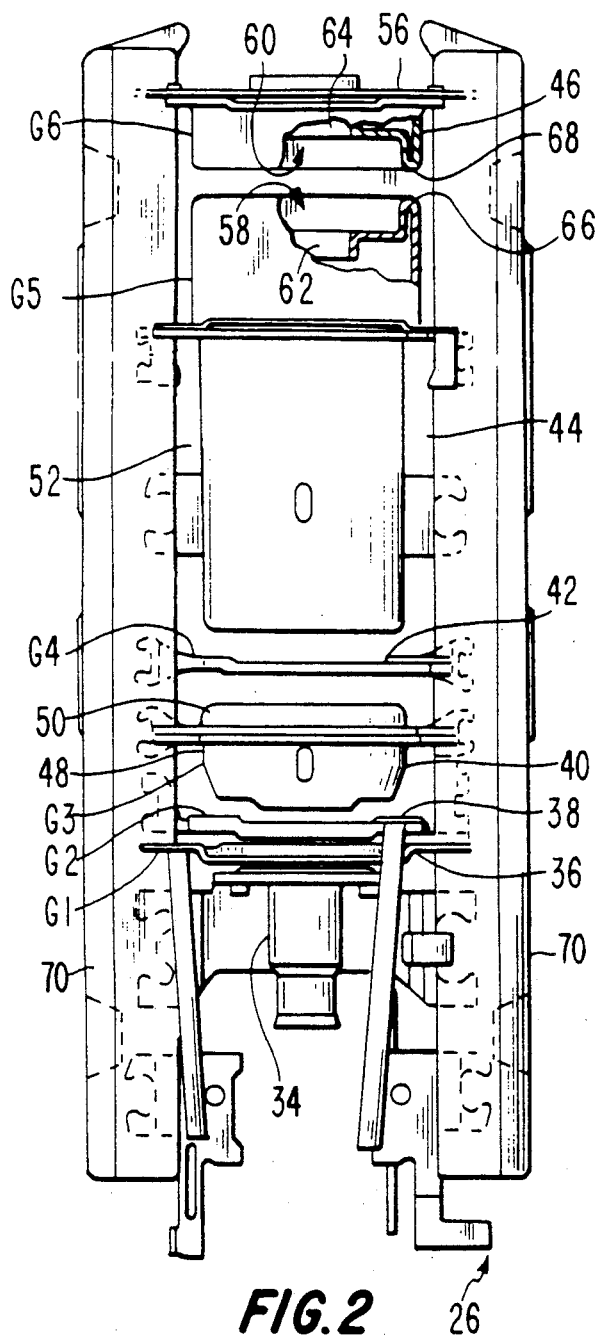
FIG. 2 is a side view of the electron gun shown in dashed lines in FIG. 1.

The details of the electron gun 26 are shown in FIG. 2. The gun 26 comprises three spaced inline cathodes 34 (one for each beam, only one being shown), a control grid electrode 36 (G1), a screen grid electrode 38 (G2), a first prefocus lens electrode 40 (G3), a second prefocus lens electrode 42 (G4), a combined third prefocus lens electrode and first main focusing lens electrode 44 (G5), and a second main focusing lens electrode 46 (G6), spaced in the order named. Each of the G1 through G6 electrodes has three inline apertures located therein to permit passage of three electron beams. The electrostatic main focusing lens in the gun 26 is formed by the facing portions of the G5 electrode 44 and the G6 electrode 46. The G3 electrode 40 is formed with two cup-shaped elements 48 and 50. The open ends of two of these elements, 48 and 50, are attached to each other. Although the G3 electrode 40 is shown as a two-piece structure, it could be fabricated from any number of elements to attain the same or any other desired length.

Figure 3:
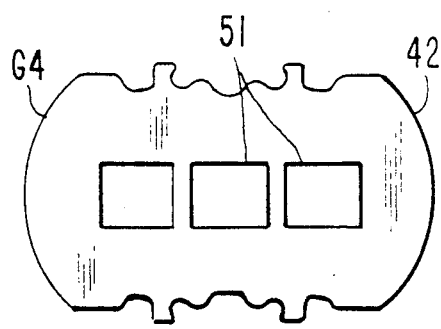
FIGS. 3 and 4 are plan views of G4 electrodes that may be used alternatively in the electron gun of FIG. 2.
Figure 4:
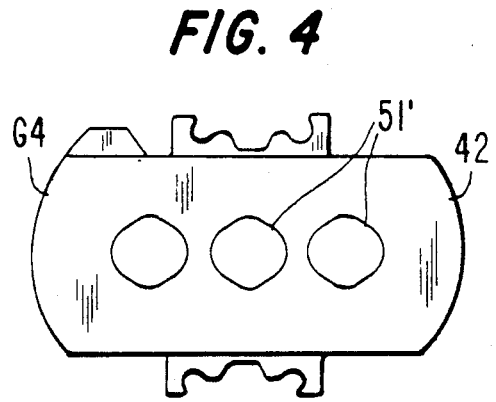

The G4 electrode 42 is a flat apertured plate. As shown in FIG. 3, the G4 electrode 42 includes three square apertures 51. Alternatively, the G4 electrode 42 may have other aperture shapes such as the lemon-shaped apertures 51' shown in FIG. 4.

The portion of the G5 electrode 44 that comprises the third prefocus lens electrode includes a cup-shaped element 52. The portion of the G5 electrode 44 that comprises the first main focusing electrode includes a somewhat cup-shaped element 54 which has its open end attached to the open end of the element 52. The G6 electrode 46 is similar in shape to the element 54, but has its open end closed by an apertured plate 56. The facing apertured closed ends of the G5 electrode 44 and the G6 electrode 46 have large recesses 58 and 60, respectively, therein. The recesses 58 and 60 set back a portion of the closed end of the G5 electrode 44 that contains three inline apertures 62 from the portion of the closed end of the G6 electrode 46 that contains three inline apertures 60. The remaining portions of the facing closed ends of the G5 electrode 44 and the G6 electrode 46 form rims 66 and 68, respectively, that extend peripherally around the recesses 58 and 60. The rims 66 and 68 are the closest portions of the two electrodes 44 and 46 to each other.

All of the electrodes of the gun 26 are either directly or indirectly connected to two insulative support rods 70. In a preferred embodiment, the support rods are of glass, which has been heated and pressed onto claws extending from the electrodes, to embed the claws in the rods.

The G6 electrode 46 is interconnected to an anode potential which is brought into the tube 10 through the anode button 16. The three cathodes 34 and the remaining electrodes 36, 38, 40, 42 and 44 are interconnected to pins in a base 72 of the tube 10. The G3 electrode 40 and the G5 electrode 44 are electrically connected. The G1 electrode 36, G2 electrode 38 and G4 electrode 42 have separate leads to separate pins in the base 72.

Referring back to FIG. 1, there is shown a portion of the electronics 100 that may operate the system as a television receiver and as a computer monitor. The electronics 100 is responsive to broadcast signals received via an antenna 102, and to direct red, green and blue (RGB) video signals via input terminals 104. The broadcast signal is applied to tuner and intermediate frequency (IF) circuitry 106, the output of which is applied to a video detector 108. The output of the video detector 108 is a composite video signal that is applied to a synchronizing signal (sync) separator 110 and a chrominance and luminance signal processor 112. The sync separator 110 generates horizontal and vertical synchronizing pulses that are, respectively, applied to horizontal and vertical deflection circuits 114 and 116. The horizontal deflection circuit 114 produces a horizontal deflection current in a horizontal deflection winding of the yoke 30, while the vertical deflection circuit 116 produces a vertical deflection current in a vertical deflection winding of the yoke 30.

In addition to receiving the composite video signal from the video detector 108, the chrominance and luminance signal processing circuit 112 alternatively may receive individual red, green and blue video signals from a computer, via the terminals 104. Synchronizing pulses may be supplied to the sync separator 110 via a separate conductor or, as shown in FIG. 1, associated with the green video signal. The output of the chrominance and luminance processing circuitry 112 comprises the red, green and blue color drive signals, that are applied to the electron gun 26 of the cathode ray tube 10 via conductors RD, GD and BD, respectively.

Power for the system is provided by a voltage supply 118, which is connected to an AC voltage source. The voltage supply 118 produces a regulated DC voltage level $+V1$ that may, illustratively, be used to power the horizontal deflection circuit 114. The voltage supply 118 also produces DC voltage $+V2$ that may be used to power the various circuits of the electronics, such as the vertical deflection circuit 116. The voltage supply further produces a high voltage $V_u$ that is applied to ultor terminal or anode buttom 16.

Circuits and components for the tuner 106, video detector 108, sync separator 110, processor 112, horizontal deflection circuit 114, vertical deflection circuit 116 and voltage supply 118 are well known in the art and, therefore, are not specifically described herein.

In addition to the foregoing elements, the electronics 100 includes a G4 modulator circuit 120. The circuit includes four main sections; (1) Horizontal Waveform Generator; (2) Low Level Video Detector; (3) Horizontal Waveform Modulator; (4) Feedback Output Amplifier. The G4 modulator circuit 120 switches between two modes in providing a voltage to the G4 electrode 42. At currents above a predetermined level, for example 200 mA peak, the tube is operated in its normal "standard" mode with the gun generating as small a spot as possible at all currents. But below 200 mA peak where the current becomes small enough to cause moiré fringes, a low level video sensor actuates a G4 modulation circuit modulating the G4 at the horizontal scan rate. Since moiré generally increases as one scans the beam from the screen center to the screen outer edges, the modulation voltage is adjusted for minimum center screen spot size with no moiré fringes, and then it is changed in a direction to over focus the beam (making larger spot sizes) as the beam is deflected toward the screen edge, just enough to overcome moiré fringes. Typical operating conditions are with the G4 at 500 volts for all currents above 200 mA; below 200 mA, the G4 is modulated at the horizontal scan rate to reduce the G4 voltage from 500 volts at screen center to zero volts at the screen edges, with the waveform tailored to eliminate moiré at all points between the screen center and screen edge.

Figure 5:
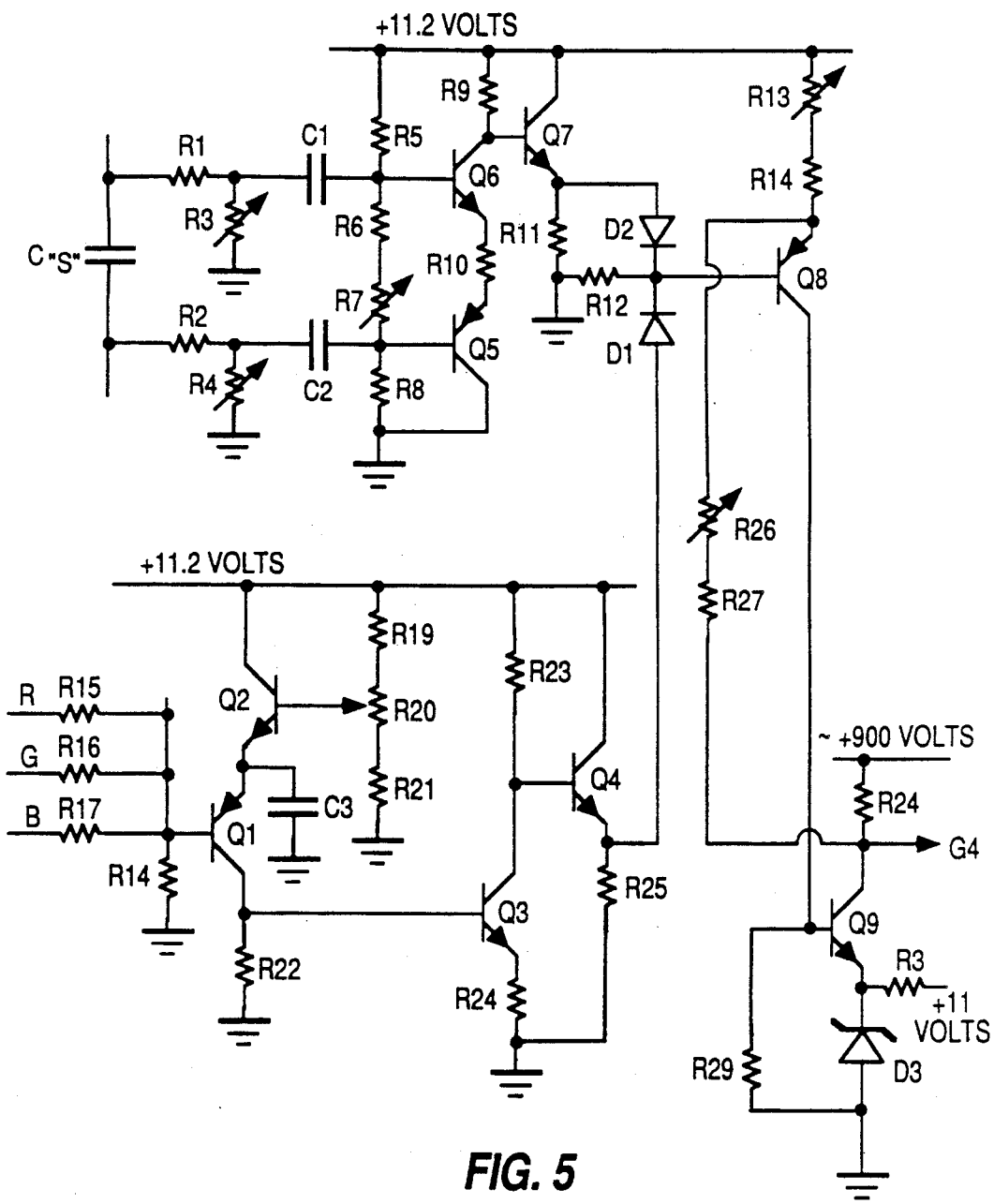
FIG. 5 is a graph showing electron beam spot size at the screen of a tube.
Figure 6:
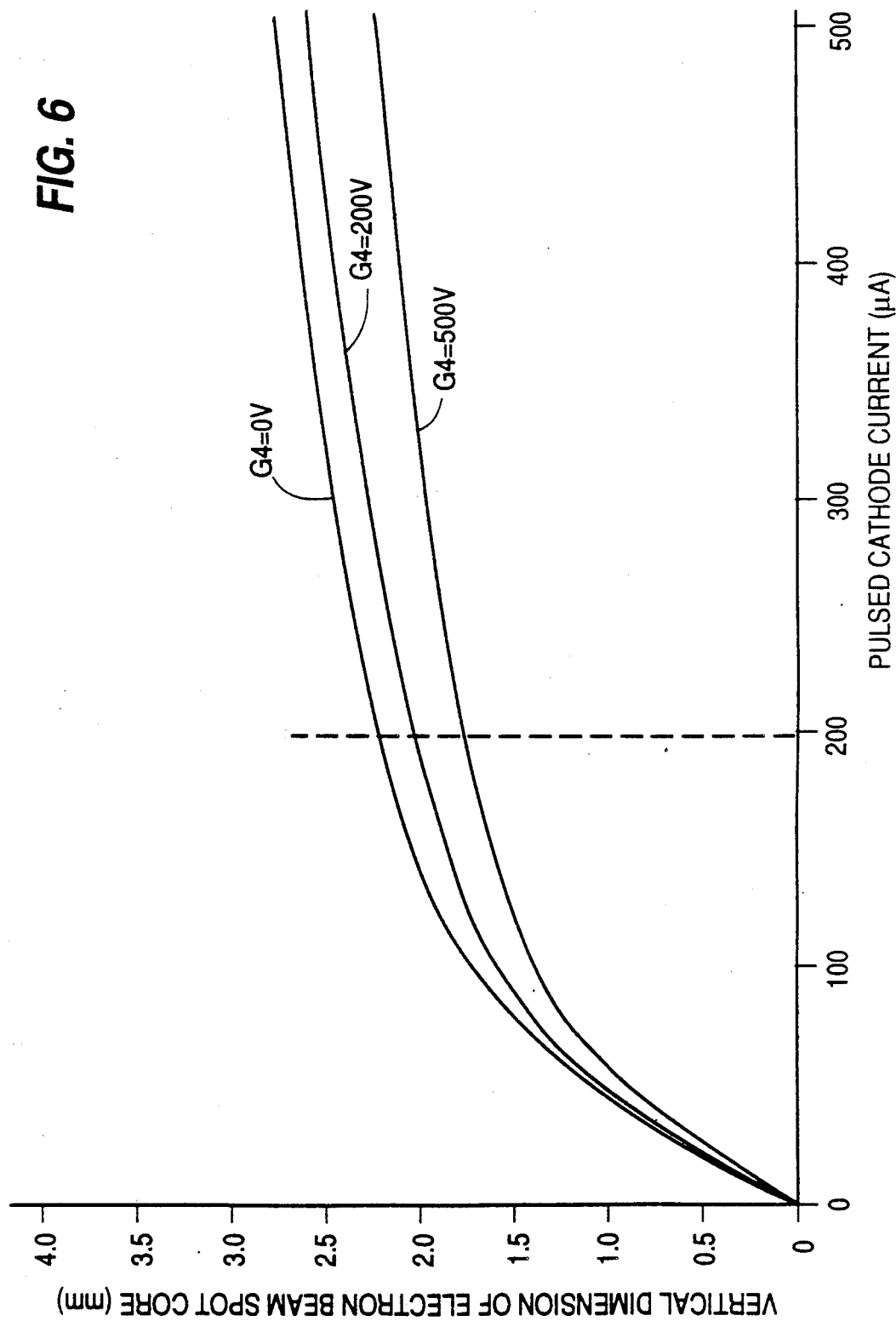

With reference to FIG. 5, the operation of the circuit is as follows. The Horizontal Waveform Generator consists of transistors Q5, Q6, Q7 and related components. the input to the circuit is a horizontal rate parabola that is developed across C-4403, the "S" capacitor in series with the horizontal winding of the deflection yoke in an RCA CTC-140 television chassis. The low end of this capacitor is not referenced to ground, but is floating at a time varying potential due to the side pin correction in the chassis. It is therefore necessary to use a differential input amplifier consisting of transistors Q5 and Q6 to subtract the time varying side pin component from the desired parabolic waveform. The parabolic waveform on the collector of Q6 is coupled to the base of emitter follower Q7 which provides a low impedance output for this circuit.

The Low Level Video Detector consists of transistors Q1 and Q4 along with the associated components. When a black or near black video signal is present on the base of Q1, the transistor is in saturation. Q1 turns off when the summed R,G,B video level on the base becomes more positive than the reference voltage $V_R$, minus Q1 base to emitter junction voltage. The reference voltage $V_R$ is chosen so that video levels representing peak beam currents below 200 mA will keep Q1 in saturation and video levels representing peak beam currents above 200 mA will turn Q1 off. $V_R$ is determined by the voltage reference circuit consisting of Q2 and associated components. This reference circuit could be replaced by a zener diode and a resistor. Transistor Q3 amplifies and inverts the output of Q1 and provides a DC voltage level shift. Transistor Q4 is an emitter follower providing a low output impedance.

The Horizontal Waveform Modulator consists of diodes D1 and D2 which couple the most positive output of either the Horizontal Waveform Generator or the Low Level Video Detector to the input of the Feedback Output Amplifier.

The feedback amplifier has a closed loop gain of approximately 100 and provides an output waveform of approximately 500 $V_{p-p}$ which is applied to the G4.

A benefit of the system is that instead of the vertical mask hole sizes having to become smaller to correct moiré, they can become larger, increasing light transmission for improved screen brightness.

What is claimed is:

1. In a color display system including a cathode-ray tube having an electron gun for generating and directing three electron beams along paths toward a screen of said tube, said gun including electrodes comprising a beam-forming region, electrodes for forming a prefocus lens and electrodes for forming a main focusing lens, and said system including a magnetic field deflection yoke, the improvement comprising
    means for applying a dynamic signal to one of said electrodes forming a prefocus lens when electron beam current drops below a predetermined level, said dynamic signal being a maximum voltage at no deflection of the electron beams and decreasing to a minimum at maximum horizontal deflection of the electron beams.

2. The system as defined in claim 1 wherein said electron gun includes six electrodes longitudinally spaced from three cathodes and said dynamic signal is applied to the fourth electrode from said cathodes.

3. In a color display system including a cathode-ray tube having an electron gun for generating and directing three electron beams along paths toward a screen of said tube, said gun including electrodes comprising a beam-forming region, electrodes for forming a prefocus lens and electrodes for forming a main focusing lens, and said system including a magnetic field deflection yoke, the improvement comprising
    means for applying a first voltage to one of said electrodes for forming a prefocus lens when electron beam current exceeds a predetermined level and for applying a dynamic signal to said one prefocus lens electrode when electron beam current drops below the predetermined level, said dynamic signal being a maximum voltage at no deflection of the electron beams and decreasing to a minimum at maximum horizontal deflection of the electron beams.

4. The system as defined in claim 3 wherein said maximum voltage equals said first voltage.

5. In a color display system including a cathode-ray tube having an electron gun for generating and directing three electron beams along paths toward a screen of said tube, said electron gun including six electrodes longitudinally spaced from three cathodes and said system including a magnetic field deflection yoke, the improvement comprising
    means for applying a first voltage to the fourth electrode from said cathode when electron beam current exceeds about 200 microamps peak and for applying a dynamic signal to the fourth electrode from said cathodes when said electron beam current drops below 200 microamps peak, said dynamic signal being equal to said first voltage at no deflection of the electron beams and decreasing to zero at maximum horizontal deflection of the electron beams.

* * * * *